United States Patent

[11] 3,629,039

[72] Inventor Richard H. Frick
 Neenah, Wis.
[21] Appl. No. 776,580
[22] Filed Nov. 18, 1968
[45] Patented Dec. 21, 1971
[73] Assignee Kimberly-Clark Corporation
 Neenah, Wis.

[54] METHOD FOR FORMING DISPOSABLE DIAPERS
 10 Claims, 14 Drawing Figs.
[52] U.S. Cl. ................................................ 156/269
[51] Int. Cl. ................................................. B32b 5/18
[50] Field of Search ........................................ 156/269,
 290, 250, 517, 521, 209, 552; 128/284, 288, 290, 287

[56] References Cited
 UNITED STATES PATENTS
 2,638,147 5/1953 Nebel ........................... 156/290 X
 3,196,874 7/1965 Hrubecky ..................... 128/287
 3,211,147 10/1965 Pherson et al. ............... 128/284
 3,295,526 1/1967 Sabee ........................... 128/287 UX Primary Examiner—Benjamin A. Borchelt
Assistant Examiner—Daniel A. Bent
Attorney—Wolfe, Hubbard, Leydig, Voit & Ossan, Ltd.

ABSTRACT: A method for inserting a leak-preventing barrier of thin impervious material between the fluid pervious cover sheet and the absorbent core of a disposable diaper is disclosed. The barrier, which preferably comprises a narrow strip of thin plastic film affixed between the cover sheet and the backing sheet along a transverse heat seal line at each end of the diaper, is first drawn from a continuous supply roll and cut into lengths twice as long as desired. Each cut length is then placed across the ends of two adjacent core pads moving along a conveyor path in end-to-end relation prior to applying a continuous cover sheet over the pads. When the material between pads is heat sealed and cut transversely to form the individual diapers, the strip is also cut in half so that one half forms the barrier for the rear end of the leading diaper, while the other half forms the barrier for the front end of the next following diaper. In its preferred form the barrier supply, cutting and placing apparatus includes a pair of vacuum rolls with valving driven in timed relation to movement of the core pads. Also disclosed is a method and apparatus for preliminarily applying limited quantities of perfume to discrete locations on the core pads before application of the barrier strip such that the perfumed portion of the pad is sandwiched between the impervious backing sheet and the impervious barrier strip.

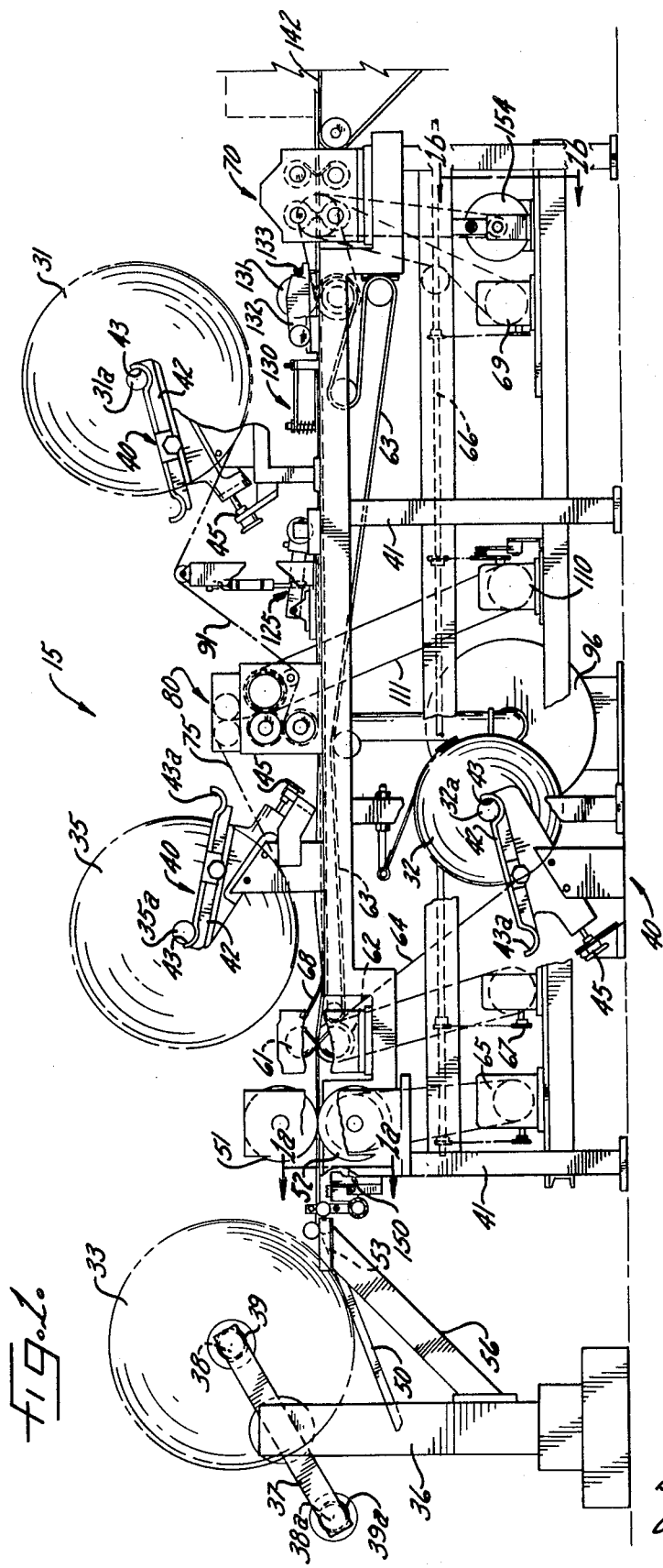
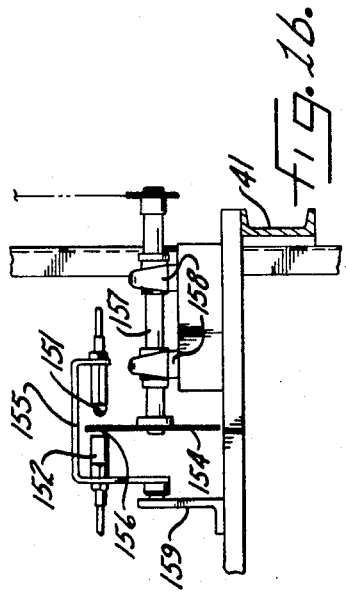
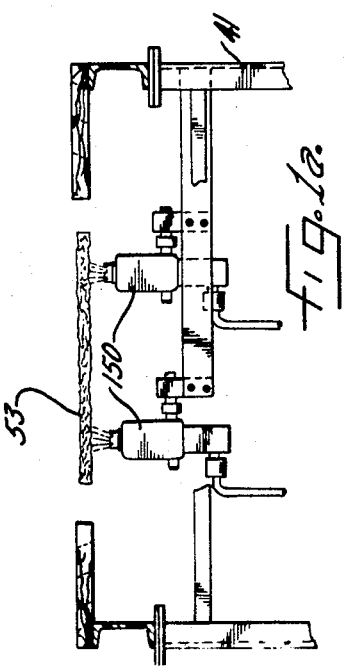

PATENTED DEC 21 1971

INVENTOR
RICHARD H. FRICK
BY
Wolfe, Hubbard, Voit & Osann
ATTORNEYS

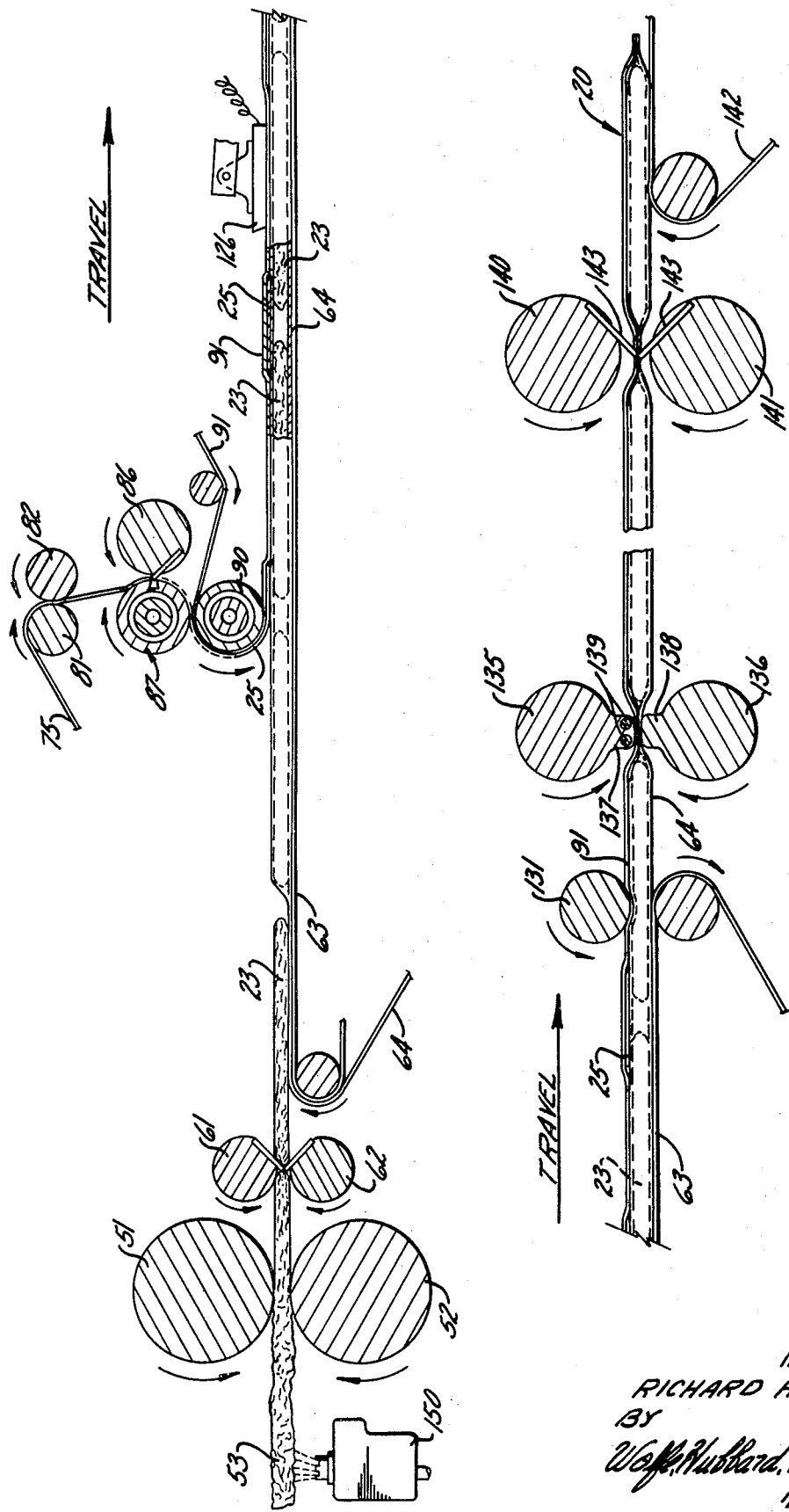

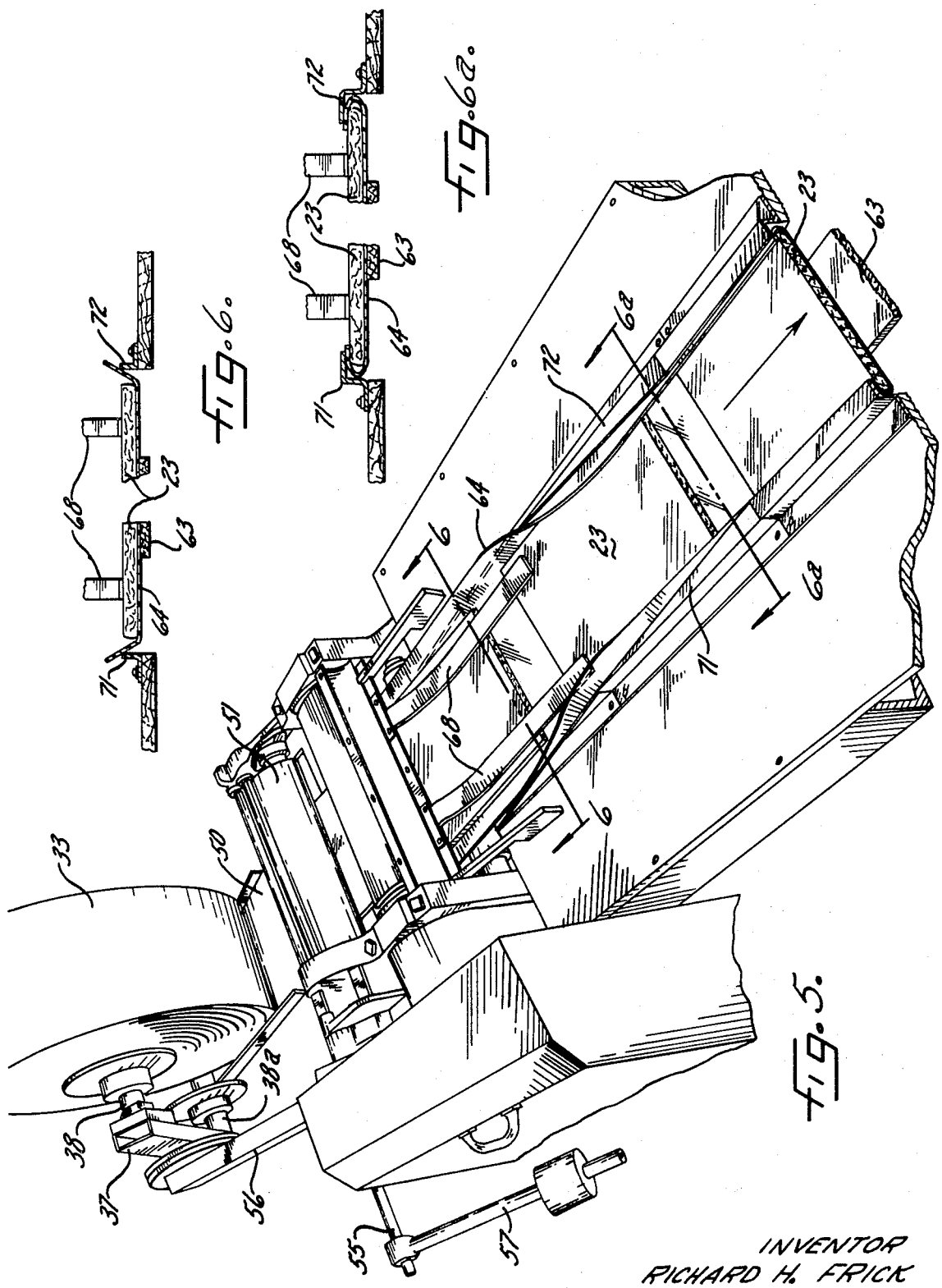

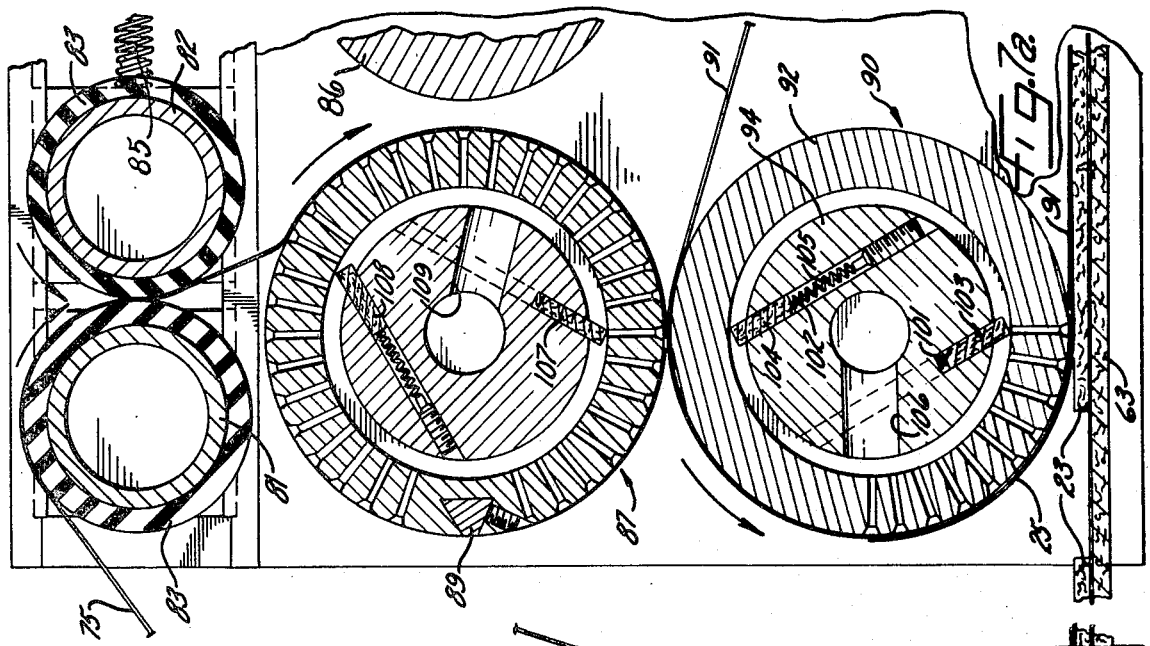
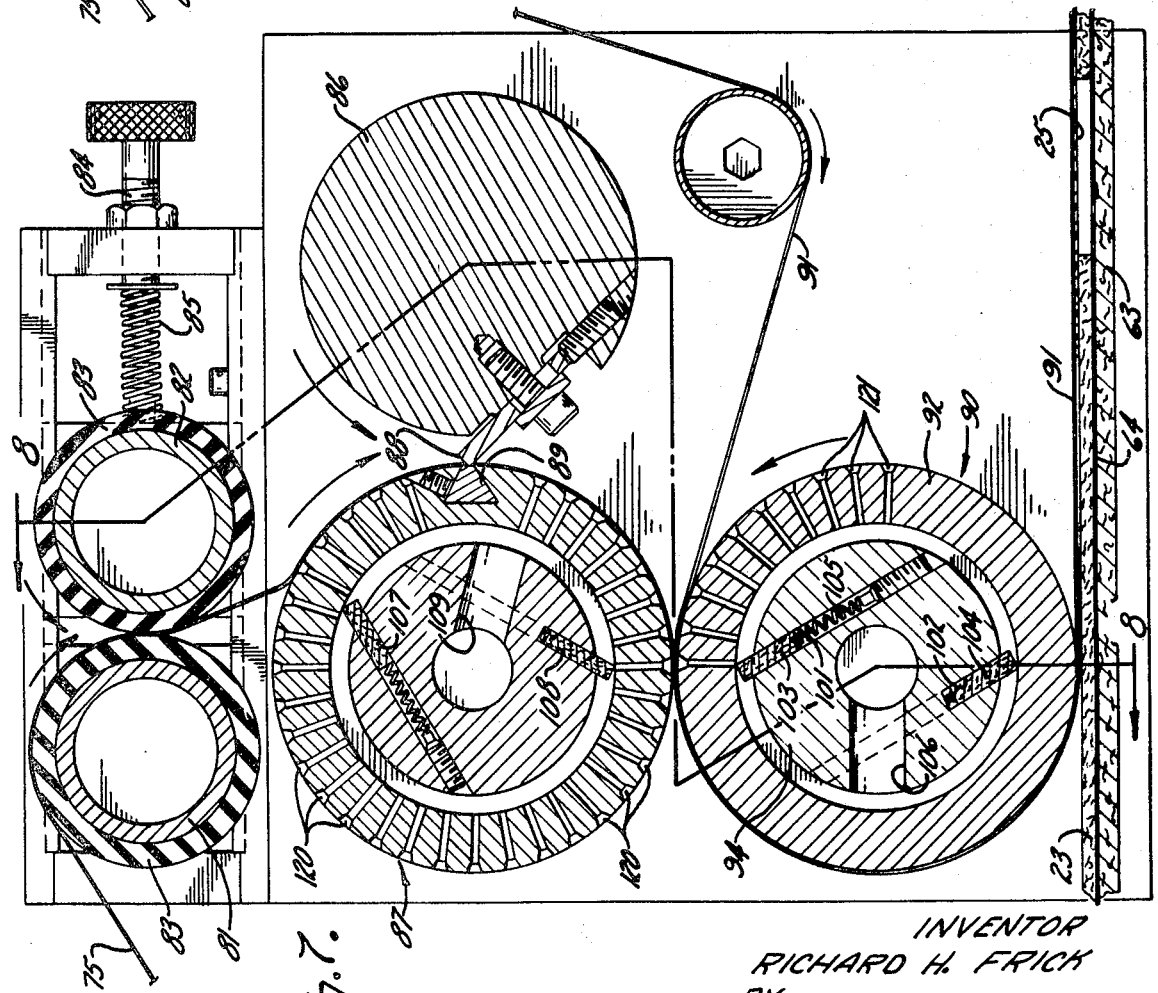

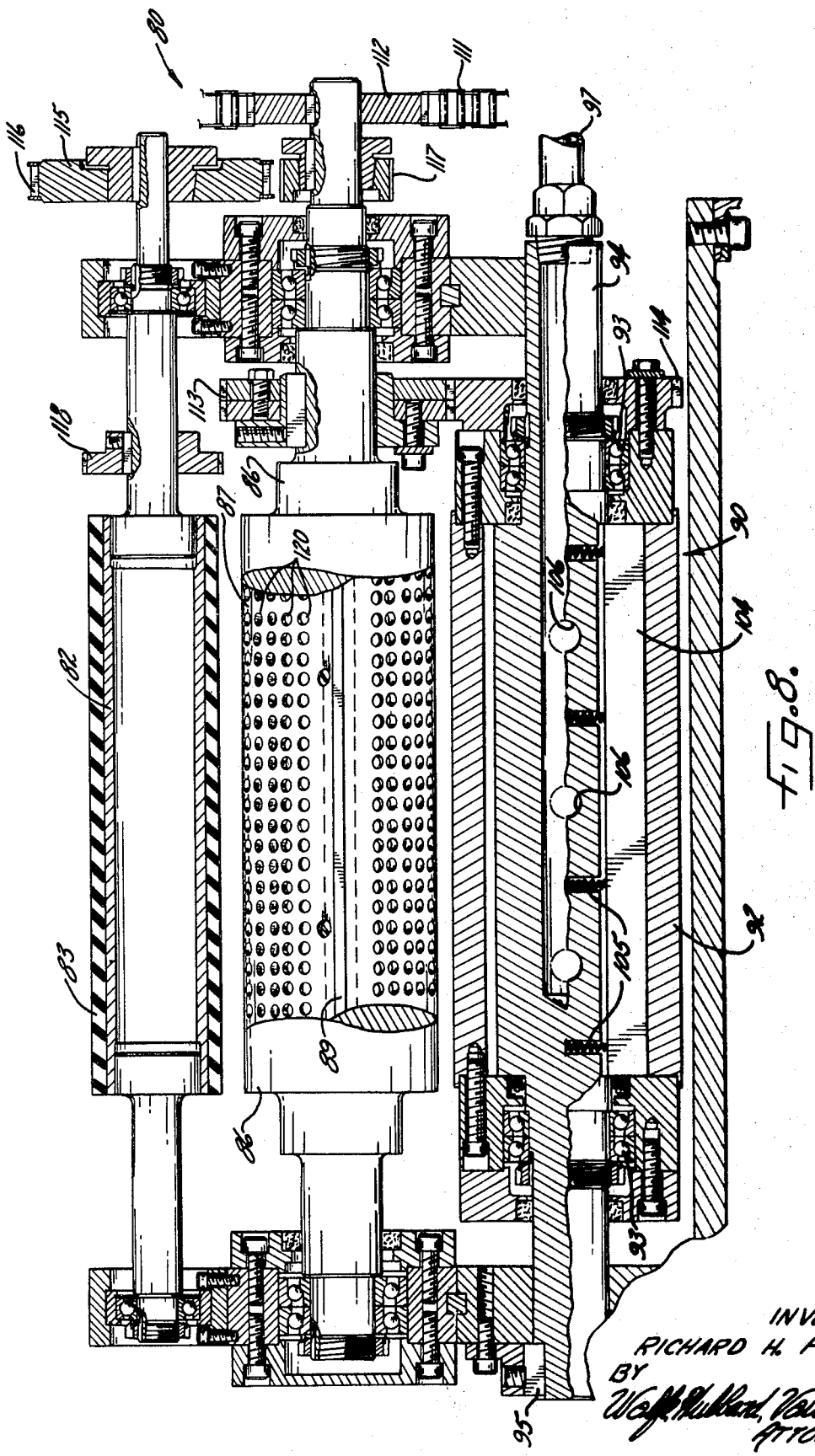

INVENTOR
RICHARD H. FRICK
BY
Wolfe Hubbard Voit & Osann
ATTORNEYS

METHOD FOR FORMING DISPOSABLE DIAPERS

In the customary methods for manufacturing disposable diapers, three continuous webs of material are fed through the processing machine. These webs comprise an upper fluid pervious cover sheet of soft fibrous material, a lower fluid impervious backing sheet which is usually a plastic film, and a central absorbent core of substantial thickness usually comprised of wood pulp fluff or plies of cellulose wadding. The outer edges of the cover sheet and backing sheet are continuously attached to each other by embossing; by overfolding and heat sealing; by adhesive attachment; or the like. Following some type of edge sealing operation, the continuous strip formed from the operation is cut into suitable diaper lengths and the ends either left unsealed with a raw cut edge, or sealed by embossing, stamping, and/or heat sealing. In another type of operation, the absorbent core may be precut into pads of a predetermined size and deposited at intervals on the backing or cover sheet before edge sealing, with subsequent transverse cutting and sealing operations being timed to take place at the interval between pads.

In either of the above operations, it is relatively easy to fold the longitudinal edges of the fluid impervious backing sheet, in either over or under lapping relationship to the cover sheet, whereby an edge channel or dam is provided along both edges of the diaper to prevent edge leakage of fluids from the absorbent core. However, it is a difficult and costly operation to perform a folding operation on the backing sheet, which operation is designed to fold the front and back ends of the sheet over the leading and trailing edges of the absorbent core, after the continuous assembly has been cut into diaper size sections. As a result, while the side edges of commercial diapers now comprise folded over portions of the backing sheet to provide leakage inhibiting means along the edges; the front and back ends of the diapers are usually either merely pinched shut and heat sealed, or left open. However, none of these arrangements provide positive end seals and serious leakage problems often exist at these ends.

Accordingly, it is the primary aim of the present invention to provide a method and apparatus for inserting a fluid impervious barrier strip under the fluid pervious cover sheet and over each end of the absorbent core of a disposable diaper prior to sealing the edges and ends of the diaper.

It is a more particular object to provide a method and apparatus for cutting double-sized strips from a continuous supply roll of barrier material, and placing the strips over the space between the adjacent ends of two moving pads of core material as well as over the ends of the core pads prior to bonding and transversely cutting the material between adjacent core pads to form individual sealed diapers.

Another object of the invention is to provide a method and apparatus for applying controlled quantities of perfume to the absorbent core of the diaper at discrete locations which are subsequently faced on one side by the fluid impervious backing sheet and on the other side by the fluid impervious barrier strip adjacent the ends of the diaper.

Other objects and advantages of the invention will become more readily apparent upon reading the following detailed description and upon reference to the drawings in which:

FIG. 1 is a side elevation of a preferred form of the diaper blank-forming machine of the present invention;

FIGS. 1a and 1b are, respectively, enlarged fragmentary sections taken along lines 1a—1a and 1b—1b in FIG. 1;

FIG. 3 is an enlarged two part schematic side elevation illustrating the operation of the principal components of the machine shown in FIG. 1;

FIG. 5 is an enlarged fragmentary perspective view of a portion of the machine shown in FIG. 1;

Figure 2:
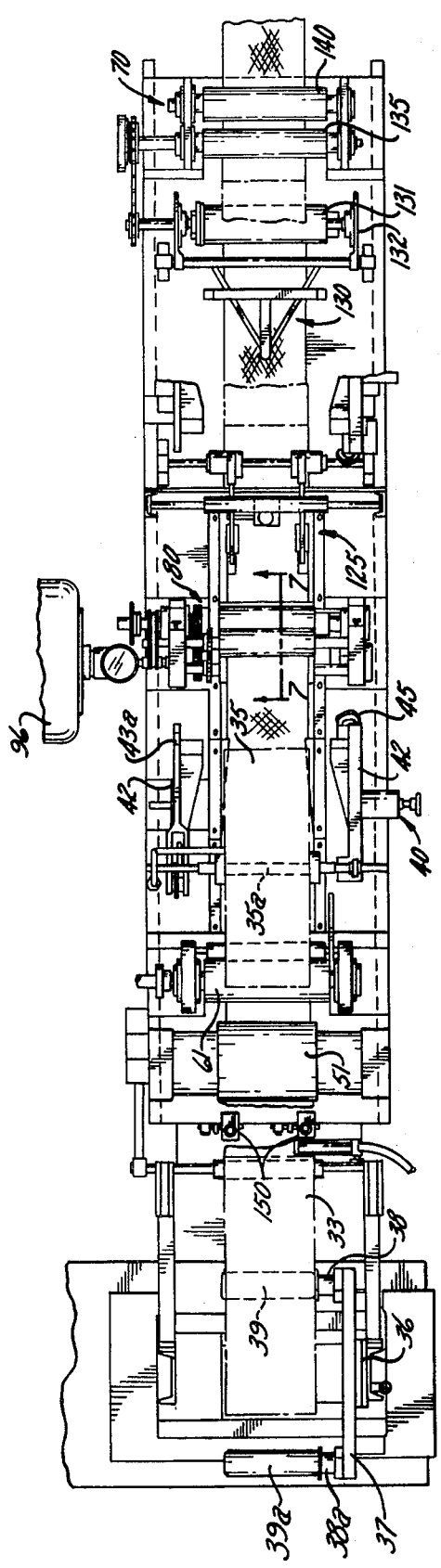
FIG. 2 is a plan view of the machine shown in FIG. 1.
Figure 9:
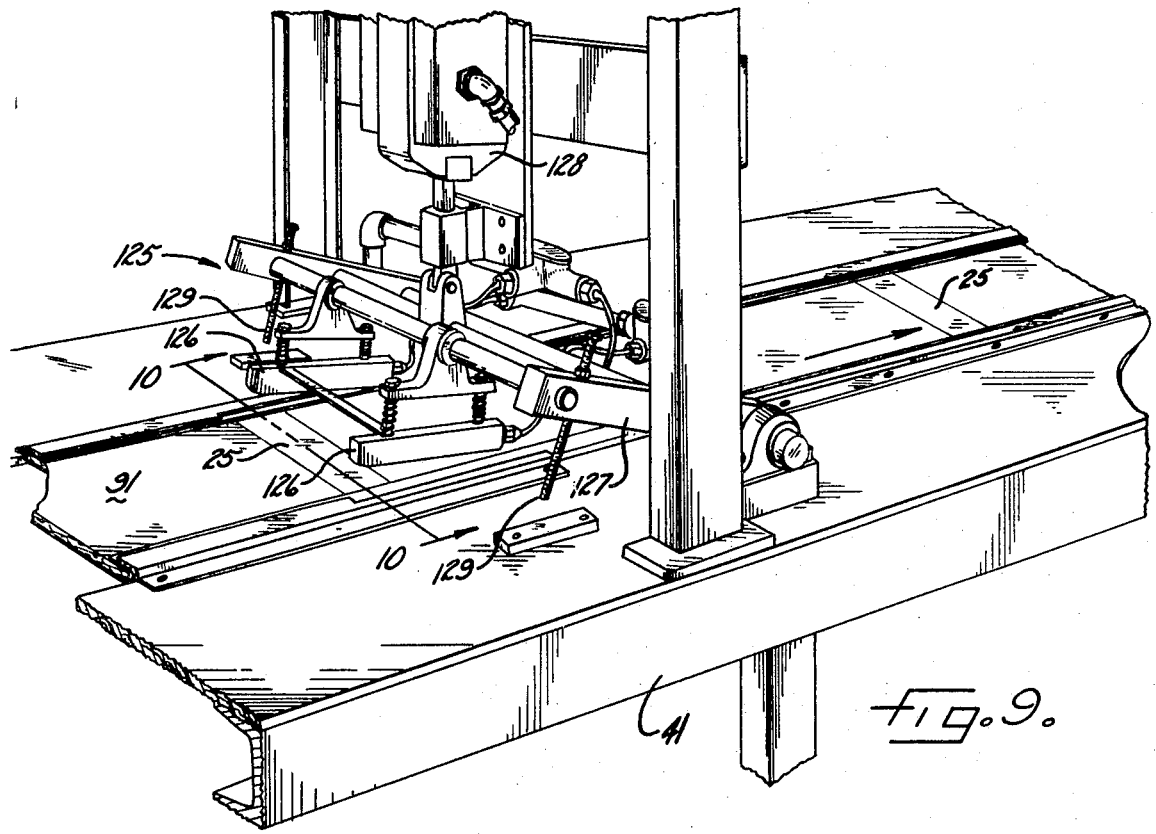
Figure 10:
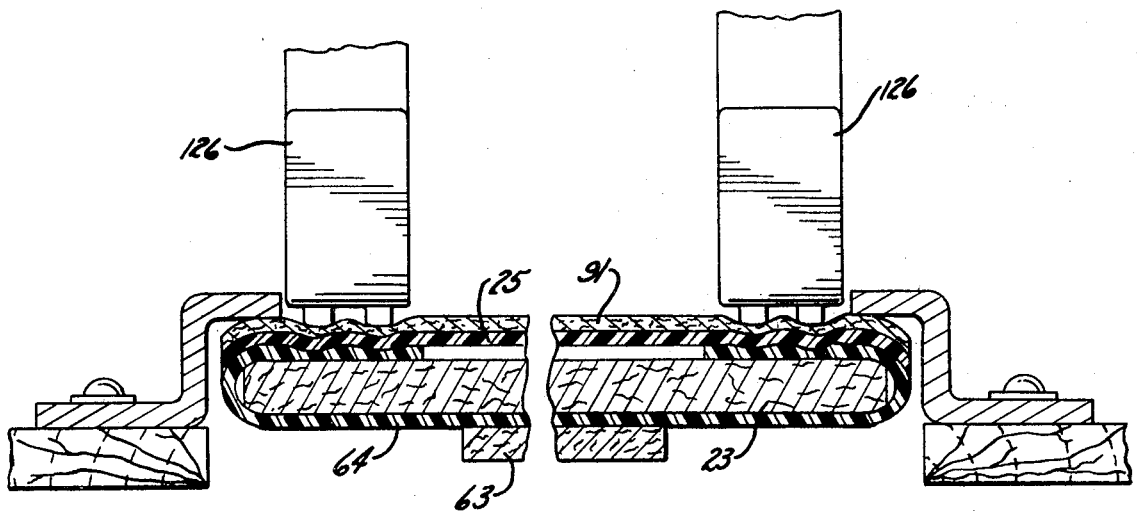

FIGS. 6 and 6a are, respectively, enlarged fragmentary sections taken along lines 6—6 and 6a—6a in FIG. 5;

FIGS. 7 and 7a are enlarged fragmentary sections taken along line 7—7 in FIG. 2, with certain of the components in FIG. 7a shown rotated through 180° from their positions in FIG. 7;

FIG. 8 is a fragmentary section taken substantially along line 8—8 in FIG. 7;

FIG. 9 is an enlarged fragmentary perspective view of another portion of the machine shown in FIG. 1; and, FIG. 10 is an enlarged fragmentary section taken along line 10—10 in FIG. 9.

Figure 4:
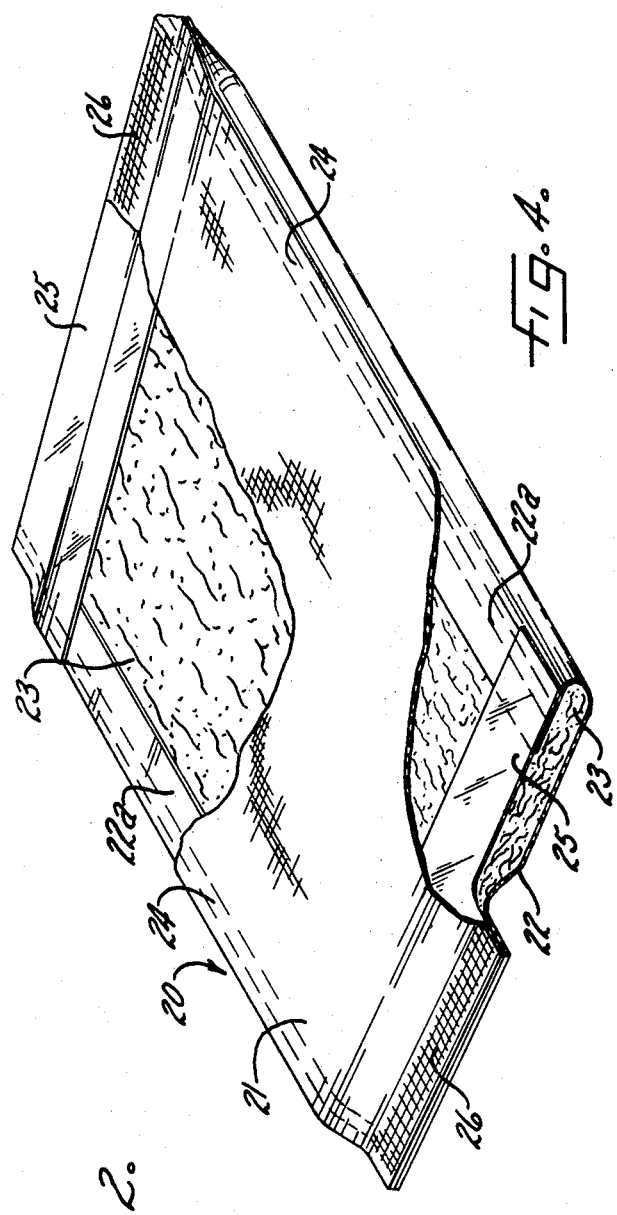
FIG. 4 is an enlarged perspective view of a preferred form of diaper blank as formed on the apparatus of the present invention with portions broken away to better illustrate the internal construction.

Turning now to the drawings, there is shown in FIG. 1 an illustrative machine 15 for making diapers 20 according to the present invention. Preferably, the diapers made on the machine 15 are of the type disclosed in copending Endres application Ser. No. 715,301, which application is also assigned to the instant assignee. As disclosed there and as illustrated in FIG. 4 of this application, the preferred diaper 20 has a fluid pervious cover sheet 21, a fluid impervious backing sheet 22, and a central core 23 comprising a substantially rectangular batt of absorbent material. The longitudinal edge portions 22a of the backing sheet 22 are folded over the respective edge portions of the core and attached to the cover sheet 21 along these edges in a narrow area 24 substantially coextensive with the edges of the core 23. The ends of both the backing sheet 22 and the cover sheet 21 extend beyond the front and back edges of the absorbent core 23 and have a thin strip 25 of plastic film interposed between them. The plastic strip 25, cover sheet 21, and backing sheet 22 are heat sealed to each other along a line 26 immediately adjacent the ends of the core 23. The edge of the thin plastic strip opposite from the heat seal line 26 extends inwardly beneath the cover 21 and over the top of the absorbent core 23 for a distance sufficient to overlie the core ends and form a fluid-retaining pocket around the ends. This construction serves to hold sudden gushes of fluid within the pocket and substantially prevents end leakage as long as the absorbent core itself has some fluid capacity left.

The type of material used in the absorbent core 23 is not critical. It may comprise a layer of cellulosic fluff from wood pulp, multiple layers of cellulose wadding, absorbent cotton or rayon fibers, or any similar material with suitable absorbent properties.

The cover sheet 21 may consist of any fluid pervious material and may consist of hydrophilic or hydrophobic components. The cover sheet should be soft and flexible and substantially nonadherent to the skin when either dry or wet. Nonwoven webs are especially suitable and may comprise natural or synthetic fibers, or mixtures thereof. Thread-reinforced nonwoven webs or cellulose wadding are also suitable. The prime characteristic necessary for the cover sheet is that it pass fluids rapidly while retaining substantially no fluid on the surface. As is well known, when such a sheet is placed in contiguous relationship to an underlying element having high-absorptive capabilities, such as wood pulp fluff, the capillary attraction exerted by the latter is sufficient to rapidly draw fluid away from the surface of the cover sheet and keep the sheet relatively dry.

The underlying fluid impervious backing 22 may be of polyethylene sheet stock or other thin plastic films such as polypropylene, polyvinylchloride or the like, which in thin calipers are soft and flexible enough to conform to the body. Use of such material, of course, eliminates the need for supplementary rubber or plastic pants. Laminates of such films with a light weight tissue may also be used. A particularly useful material is 1-mil thick, white-pigmented taffeta-embossed polyethylene.

The thin plastic film for the barrier strip 25 is also preferably of a flexible sheet stock having the above properties. A particularly suitable film is a smooth clear polyethylene 1-mil thick. It is preferred that this element be as thin as possible and still perform its function. While thicker films provide greater strength, films as thin as ½ mil have proved satisfactory where a high degree of additional strength in the end of the diaper was not required.

The size of the diaper may vary according to needs. One suitable finished size is 12-½×17-½ inch. Of the elements comprising the diaper, the cover sheet 21 is 12-½×17-½ inch; the backing sheet 22 is 15×17-½ inch, whereby each edge may be folded back over the top of the core a little more than 1 inch; the core 23 is 12-½×16 inch so that the cover and backing extend approximately ½ inch beyond each end to allow for heat sealing; and the plastic film insert 25 is 12-½×2-½ inch, extending across the entire width of the diaper and into the interior about 2 inch.

In manufacturing the diaper in accordance with the present invention, 5 inch strips of plastic are used as the base material for the barrier dam. As will be described below these strips are cut and placed to overlie the ends of two adjacent core pads under a continuous cover sheet. When the continuous assembly is cut transversely between pads and simultaneously heat sealed to form the individual diapers, the strip is also cut in half so that one half forms the dam for the rear of the leading diaper, while the other half forms the dam for the front of the next following diaper.

As shown in FIG. 1, the material for the cover 21, backing sheet 22, core 23 and the plastic strip 25 are continuously fed into the machine 15 from respective supply rolls 31, 32, 33 and 35. The supply roll 33 of core material is suitably supported at the entrance end of the machine 15 by a standard 36 carrying an arm 37 from which a support shaft 38 projects. Preferably a sleeve 39 is journaled on the shaft and is externally dimensioned to be received within the central opening of the supply roll 33. The arm 37 may also be provided with a second shaft 38a and sleeve 39a on which a new supply roll of core material (not shown) may be mounted before the initial supply roll 33 is completely exhausted.

Each of the other supply rolls 31, 32 and 35 is preferably wound on a shaft 31a, 32a and 35a and these shafts are suitably journaled and supported by similar craddle assemblies 40 secured to the frame 41 of the machine 15. Each craddle 40 includes a pair of laterally spaced support arms 42 (only one shown) adapted to straddle the ends of the respective supply rolls 31, 32 and 35 and journal the shafts 31a, 32a and 35a in a cup-shaped notch 43. The arms 42 may also be provided with a second notch 43a to receive the shaft of a second supply roll (not shown) before the initial roll is entirely used. Each craddle 40 is also preferably provided with an adjusting means, shown here as a screw 45, for changing the angle of the craddle 40 so that the material from the supply rolls 31, 32 and 35 is fed straight into the machine 15.

Referring now to FIGS. 1–3 and 5, a relatively thick layer 53 of core material is drawn from supply roll 33 over a guide tray 50 by a pair of feed rolls 51 and 52, which are preferably spaced so that the layer 53 of core material is slightly compressed as it passes through the rolls. The guide tray 50 is cantilevered from a rod 55 pivotally mounted in a pair of support arms 56 secured to the standard 36 and is biased against the supply roll 33 by the moment afforded by an oppositely projecting weighted arm 57 secured to the rod 55. In this way the layer 53 of core material is drawn evenly from the roll 33 and is guided and supported as it passes into the feed rolls 51, 52.

From the feed rolls 51, 52 the layer 53 of core material is fed between a pair of cutoff rolls 61, 62 and onto a conveyor belt 63 which also draws a web 64 of the backing material from supply roll 32. It will be understood that the cutoff rolls cut the layer 53 of core material into lengths determined by the circumference of the rolls 61, 62, for example 16 inches. As shown in FIG. 1 the feed rolls are driven by suitable timing chains or the like from a gear box 65 coupled to a drive shaft 66 which is rotated by an external power source (not shown). The cutoff rolls 61, 62 are also driven from the drive shaft 66 through a gear box 67 in a similar manner.

In order to space the blanks 23 of core material apart on the backing sheet web 64, the conveyor 63 is driven at a speed slightly faster than the peripheral speed of the feed rolls 51, 52 and cutoff rolls 61, 62. If the diapers are to be 17 ½ inches long, the 16 inch core pads are spaced 1 ½ inch apart. A pair of hold down straps 68 help to position the core pads 23 on the web of backing material. The drive for the conveyor 63 is also from the shaft 66 through a gear box 69 by suitable timing chains or belts. In the machine illustrated the gear box 69 also drives a sealing and cutoff unit 70 to be described below.

As the web 64 of backing material and the spaced blanks of core material travel on the conveyor 63, the edges of the web 64 are raised and folded over the edges of the core blanks 23. For this purpose the machine 15 is equipped with a pair of laterally spaced folding bars 71, 72, one on each side of the conveyor 63 (see FIGS. 5, 6 and 6a).

In accordance with the present invention, the barrier strips 25 are cut from a continuous web 75 of material on supply roll 35 and are placed to overlie the ends of two adjacent core pads 23 and bridge the space between the pads by a vacuum transfer and cutoff apparatus 80 positioned above the conveyor 63. Referring now to FIGS. 3, 7, 7a and 8 the web 75 is drawn from the roll 35 by a pair of feed rolls 81, 82 journaled by bearings in framing elements of the apparatus 80. The feed rolls are preferably provided with resilient covers 83 and the pressure between rolls may be adjusted by suitable means such as an adjusting screw 84 and biasing spring 85 (see FIG. 7).

On the egress side of the feed rolls 81, 82, the web 75 is fed into the nip of a pair of cutoff rolls 86, 87 journaled by bearings in frame elements of the apparatus 80. In the apparatus illustrated, the roll 86 carries an adjustable knife edge 88 positioned to strike an elongated anvil 89 on the roll 87. It will be understood that a strip of the barrier material is cutoff the web during each revolution of the rolls 86, 87.

To carry the cut strip of barrier material to the conveyor 63 and place it over the ends of a pair of adjacent core pads, the apparatus 80 includes a pair of vacuum rolls; one of which, in the preferred embodiment, is the roll 87. Another vacuum roll 90 engages the roll 87 from below and is disposed just above the conveyor 63. As shown in FIGS. 3, 7 and 7a, the web 75 of material from the feed rolls 81, 82 drapes over the surface of the roll 87. After a strip of material is cut from the web it is carried on the surface of the roll 87 to the nip formed with roll 90 where it meets a continuous layer 91 of the cover material drawn from supply roll 31. At this point, the vacuum within roll 87 is broken and the strip is transferred to and carried by roll 90 along with the cover layer 91 and placed over the ends of two core pads 23 (see FIG. 7a). Since this cover layer 91 is made of a fluid pervious material the vacuum within roll 90 is effective to hold the barrier strip against cover layer until the vacuum is broken. Thus as the cover layer 91 is laid over the core pads 23 by the roll 90, the strip is inserted between the layer 91 and the ends of adjacent core pads.

As shown in FIG. 8 vacuum roll 90 includes a hollow, cylindrical shell 92 journaled by bearings 93 on a centrally disposed shaft 94 which is secured, such as by a key 95, to the frame of the apparatus 80. The shaft 94 is also hollow and is coupled to a vacuum pump 96 (see FIG. 1) by a conduit 97, only a portion of which is shown in FIG. 8. The shaft is further provided with a pair of elongated slots 101, 102 for slidably retaining sealing vanes 103, 104 which are biased by springs 105 against the inner periphery of the shell 92. Between the vanes 103, 104 the shaft 94 is cross bored at 106 to provide communication for the vacuum. Thus, a vacuum is drawn only in the left-hand half (as seen in FIG. 7) of the roll 90. The interior construction and mounting arrangement of the roll 87 is similar although its sealing vanes 107, 108 and cross-bored apertures 109 are located so the vacuum is drawn only in the right-hand half of this roll.

It will be understood that the feed rolls 81, 82 cutoff roll 86 and vacuum rolls 87, 90 are driven in timed relation with the movement of the core pads 23 and backing sheet 22 on the conveyor 63. For this purpose a gear transfer case 110 is driven by drive shaft 66 is coupled to cutoff roll 86 by a suitable chain 111 and sprocket 112 (see FIG. 1 and 8). A gear 113 on the cutoff roll shaft drives vacuum roll 90 through a gear 114 secured to the shell 92. Another gear (not shown) on the shell of roll 87 is also driven by gear 113. The sprocket ratio and gearing arrangement for the rolls 86, 87 and 90 is such that they all are rotated with a peripheral speed equal to the speed of conveyor 63 and each of these rolls has an effective circumference equal to one diaper length, for example, 17½ inches.

The length of the barrier strip is governed by the rotational speed of the feed rolls 81, 82 relative to the rolls 86, 87 and 90. As shown in FIG. 8, feed roll 82 has a sprocket 115 keyed on one end which is driven by a chain 116 and a sprocket 117 keyed on the shaft of the cutoff roll 86. A gear 118 on feed roll 82 drives feed roll 81 through another gear not shown. In the example given previously a 5-inch strip is cut and therefore the number of teeth on sprockets 115 and 117, respectively, may be 10 and 34, for example.

From the foregoing it will be seen that feed rolls 81, 82 rotate slower than cutoff rolls 86, 87. Thus, prior to cutting, the web 75 of barrier material is slippingly engaged on the surface of roll 87 which is preferably perforated around its periphery with rows of apertures 120 through which the vacuum is drawn. The lower vacuum roll 90 is, however, preferably perforated with apertures 121 over only a portion of its periphery since only a 5 inch strip is carried by the vacuum drawn through this roll.

Following placement of the barrier strip and cover layer over the core pads 23, the composite web is fed into an edge-sealing apparatus 125. In the illustrated machine 15, the edge sealing is accomplished by the application of heat sufficient to activate the thermoplastic characteristics of the folded over edges of the backing material. As shown in FIGS. 9 and 10 a pair of heating irons 126 are resiliently mounted above the edges of the moving web by a support frame 127. The support frame is preferably pivotally mounted on the machine frame so that it may be raised and lowered by suitable means, such as an air cylinder 128. The frame 127 also carries a pair of adjusting screws 129 to control the working height of the heating irons 126. In the illustrated machine, heat for the heating irons may be supplied by electrically energized heating elements enclosed within the irons, but other heat sources can also be used.

Following the edge sealing operation the composite web is smoothed out by a spreader 130 resiliently mounted on the machine frame and then the web is slightly flattened by an idling roller 131 journaled by a pair of arms 132 pivotally mounted on the machine frame. The working height of the roller 131 and thus its flattening effect is controlled by an adjusting bolt 133 at the free end of each arm 132. The cooperation between the idling roller 131 and the conveyor 63 also directs the web of material into the end sealing and cutoff unit 70.

In the space between adjacent core pads 23, the cover sheet 21, backing sheet 22 and the barrier strip 25 are pressed and bonded together. As best seen in FIG. 3, the end seal in the illustrated machine 15 is made by a pair of rotating sealing rolls 135, 136, formed with elongated sealing lobes 137, 138 which come together in timed sequence to press and bond together the components of the web between core pads 23. The upper sealing roll 135 is preferably heated such as by electrically energized heating elements 139. The faces of the sealing lobes 137, 138 may be formed to make two adjacent sealing lines, one on each side of the transverse center line between core pads 23, or they may be essentially flat to bond the entire area between core pads. In either case it is important, however, that the end sealing apparatus be effective to form a continuous cross seal on either side of the center line between core pads.

Synchronized for rotation with the sealing rolls 135, 136 are a pair of cutoff rolls 140, 141 which are timed to cut the material along the transverse centerline between adjacent core pads 23 and thus separate the moving web into individual diapers 20. The cut diapers are discharged onto a conveyor 142 for delivery to suitable folding or packaging apparatus (not shown). The cutoff rolls may each be provided with elongated cutting elements 143, as shown in FIG. 3, or one may be provided with such a cutting edge and the other a cooperating anvil. It should be understood, of course, that other forms of end sealing and cutoff apparatus may also be employed without departing from the present invention.

As previously mentioned, the end sealing and cutoff unit 70 is driven from the drive shaft 66, through a gear box 69 by suitable timing chains or the like. Preferably, the sealing rolls 135, 136 and cutoff rolls 140, 141 are interconnected by meshing gears (not shown) to keep the rotation of the rolls synchronized. Also, since the conveyor 63 is driven from gear box 69, it will be appreciated that rotation of the sealing rolls and cutoff rolls is always properly timed relative to movement of the conveyor.

Pursuant to another aspect of the present invention, provision is made for applying controlled quantities of perfume to the diapers as they are being made. Also in order to retain the essential essence of the perfume as long as possible, the perfume is preferably applied to the absorbent core 23 near one end where it will be covered on one side by the impervious backing sheet 22 and on the other side by the impervious barrier strip 25. Accordingly, in the illustrative machine the perfume is applied to the core material at the entrance end of the machine.

As shown in FIGS. 1-3, the perfume is applied to the underside of the core material by a pair of perfume guns 150 as the core material is drawn from the roll 33. The guns 150 are preferably of the solenoid-actuated type and are electrically controlled by a light 151 and photocell 152 (see FIG. 1b) in combination with appropriate circuitry (not shown). When the photocell "sees" the light the circuit is energized actuating the guns 150. The location of the light 151 and photocell is not critical and in the illustrative machine 15 they are located below the sealing and cutoff unit 70.

To control actuation of the perfume guns 150, a rotatable timing disc 154 is interposed between the light 151 and photocell 152 which are mounted on a bracket 155 in alignment with an aperture 156 in the disc. As the disc rotates, the photocell sees the light as the aperture passes by on each revolution. The disc is mounted on a shaft 157 journaled in bearings 158 secured to the machine frame 41 and the bracket 155 is pivotally mounted on a support 159 coaxially of the shaft 157. Rotation of the disc 154 is timed with the other functions of the machine 15. In this instance the disc is driven from drive shaft 66, through gear box 69 by suitable drive chains or the like such that the disc makes one revolution for each 16 inch length of core material drawn into the machine by the feed rolls 51, 52. The exact location of the perfume relative to the ends of the subsequently cut core blanks 23 may be controlled by rotating the bracket 155 about its mounting pivot. The quantity of perfume applied by the guns may be controlled by regulating the duration of actuation of the guns, such as by a pulse timer in the control circuitry (not shown).

The overall operation of the machine 15 and the method by which the diapers 20 are made should now be apparent to those skilled in the art. However, the following brief summary may also be helpful.

As the layer 53 of core material is drawn from supply roll 33 by feed rolls 51, 52, controlled quantities of perfume are squirted on the underside of the layer at discrete spots by the perfume guns 150 so that these perfumed spots are located near the end of the core blanks 23 when they are cut off by rolls 61, 62. The core blanks 23 are then deposited on a web 64 of the impervious backing material drawn from supply roll 32 and moving along the upper surface of conveyor 63. A web 75 of barrier material is drawn from roll 35 by feed rolls 81, 82 and a strip is cut by rolls 86, 87. The cut strip is carried partially around roll 87 by vacuum attachment to the nip formed with roll 90 where a layer 91 of cover material is fed from supply roll 31. Vacuum drawn through roll 90 carries the barrier strip through a partial revolution and places it over the ends of two adjacent core pads 23 traveling on the moving web 64 of backing material. The cover layer 91 is also simultaneously laid over the core pads 23 and barrier strip 25 by the roll 90.

The edges of the composite web are then sealed by sealing irons 126 and, after the web is spread and somewhat flattened, the material between core pads 23 is bonded together by sealing rolls 135, 136 and successive diapers 20 are cut off by rolls 140, 141. The individual diapers are then discharged onto conveyor 142 for delivery to suitable folding or packaging apparatus.

While the invention has been described in connection with certain preferred embodiments and procedures, it is not intended to so limit the invention. Rather, it is intended to include such other alternative and equivalent embodiments and procedures as fall within the spirit and scope of the appended claims.

I claim as my invention:

1. The method of making disposable diapers comprising the steps of:
    supplying a continuous web of impervious backing material along a generally longitudinal flow path;
    depositing precut blanks of absorbent core material in spaced part, end-to-end relation on the moving web;
    bridging the spaces between and covering the end portions of adjacent blanks as they move on the web with longitudinally spaced barrier strips of impervious material extending across the web;
    applying a continuous cover layer of pervious material over the barrier strips and core blanks;
    sealing the edges of the composite web;
    bonding together the portions of the backing material, the barrier strips and the cover layer on each side of a transverse line located centrally in each of the spaces between core blanks; and,
    cutting the composite web along the transverse line to separate the web into individual diapers.

2. The method defined in claim 1 including the step of folding the edges of the web of backing material over the edges of the core blanks prior to bridging the spaces between adjacent blanks with the barrier strips.

3. The method defined in claim 2 wherein the web of backing material has thermoplastic characteristics at least along the edges thereof and the edges of the composite web are sealed by applying heat to the edges of the cover layer where it overlies the folded over edges of the web of backing material.

4. The method defined in claim 1 wherein the barrier strips are made of thermoplastic material and heat is utilized to bond the backing material, the barrier strips and the cover layer together in the spaces between core blanks.

5. The method of defined in claim 1 including the preliminary step of applying a measured quantity of perfume to each of the core blanks at discrete locations which are subsequently covered on one side by the web of impervious backing material and on the other side by the impervious barrier strips.

6. The method defined in claim 1 including the preliminary steps of unwinding a roll of absorbent core material;
    applying measured quantities of perfume to the underside of the core material at discrete locations; and,
    cutting the core material into individual blanks each having a perfumed portion adjacent one end thereof to be subsequently covered by one of the barrier strips.

7. The method defined in claim 1 including the additional step of supplying a continuous sheet of barrier strip material at a rate slower than that of the moving web and cutting the sheet into separate barrier strips in timed relation to movement of the web.

8. The method defined in claim 7 wherein the barrier material is supplied by passing the sheet first between a pair of feed rollers having a peripheral speed slower than that of the moving web, then between a pair of cutoff rolls and a pair of vacuum rolls moving in timed relation with the web.

9. The method defined in claim 8 including the step of breaking the vacuum of one of said pair of vacuum rolls adjacent the nip of the rolls so as to transfer the cut strip of barrier material from said one roll to the other.

10. The method defined in claim 9 including the further step of breaking the vacuum of the other vacuum roll adjacent a line tangent with the surface of the moving web to transfer the cut strip from the roll to the web.

* * * * *